United States Patent
Fu et al.

(10) Patent No.: US 12,318,914 B2
(45) Date of Patent: Jun. 3, 2025

(54) DEVICE FOR CORRECTING ROBOT TEACHING POSITION, TEACHING DEVICE, ROBOT SYSTEM, TEACHING POSITION CORRECTION METHOD, AND COMPUTER PROGRAM

(71) Applicant: FANUC CORPORATION, Yamanashi (JP)

(72) Inventors: Wanfeng Fu, Yamanashi (JP); Kyouhei Kokubo, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 300 days.

(21) Appl. No.: 17/916,028

(22) PCT Filed: Mar. 26, 2021

(86) PCT No.: PCT/JP2021/013092
§ 371 (c)(1),
(2) Date: Sep. 30, 2022

(87) PCT Pub. No.: WO2021/200743
PCT Pub. Date: Oct. 7, 2021

(65) Prior Publication Data
US 2023/0158687 A1   May 25, 2023

(30) Foreign Application Priority Data
Apr. 2, 2020   (JP) .................................. 2020-067082

(51) Int. Cl.
*B25J 13/08*   (2006.01)
*B25J 9/00*   (2006.01)
(Continued)

(52) U.S. Cl.
CPC .......... *B25J 13/089* (2013.01); *B25J 9/0081* (2013.01); *B25J 9/1697* (2013.01); *B25J 19/023* (2013.01);
(Continued)

(58) Field of Classification Search
CPC ...... B25J 13/089; B25J 9/0081; B25J 9/1697; B25J 19/023; B25J 9/1664; G05B 2219/40383; G05B 2219/40387
See application file for complete search history.

(56) References Cited

U.S. PATENT DOCUMENTS 10,434,655 B2 * 10/2019 Suzuki .................. B25J 9/1692
10,948,317 B2 *  3/2021 Sugita .................. G01D 5/2405
(Continued)

FOREIGN PATENT DOCUMENTS

CN   109311163 A   2/2019
JP   2010076054 A   4/2010
(Continued)

*Primary Examiner* — Sohana Tanju Khayer
(74) *Attorney, Agent, or Firm* — HAUPTMAN HAM, LLP

(57) ABSTRACT

A device to correct a teaching position of a robot includes an orientation change data acquisition section to acquire orientation change data indicating a change amount in an orientation of a workpiece with respect to the robot due to a change of an arrangement, based on first and second position data of the robot, a third position data acquisition section to acquire third position data of the robot when a hand-tip portion is arranged in a predetermined positional relationship with an index in a state where the hand-tip portion is arranged at a second orientation which is corrected by using the orientation change data, and a position change data acquisition section to acquire position change data indicating a change amount in a position of the workpiece with respect to the robot due to the change of the arrange- (Continued)

ment, based on the first position data and the third position data.

8 Claims, 11 Drawing Sheets

(51) Int. Cl.
  *B25J 9/16* (2006.01)
  *B25J 19/02* (2006.01)
(52) U.S. Cl.
  CPC ... *B25J 9/1664* (2013.01); *G05B 2219/40383* (2013.01); *G05B 2219/40387* (2013.01)

(56) References Cited

U.S. PATENT DOCUMENTS

| | | | |
|---|---|---|---|
| 2005/0225278 A1* | 10/2005 | Ban | B25J 9/1692 318/568.11 |
| 2015/0088311 A1* | 3/2015 | Suzuki | B25J 9/1697 700/254 |
| 2015/0146215 A1* | 5/2015 | Kobayashi | G01B 11/2504 356/610 |
| 2016/0368150 A1* | 12/2016 | Maruyama | B25J 19/021 |
| 2018/0126553 A1* | 5/2018 | Corkum | B25J 9/1697 |
| 2018/0297198 A1* | 10/2018 | Dan | B25J 9/163 |
| 2019/0030722 A1* | 1/2019 | Yamaguchi | B25J 9/1697 |
| 2019/0091865 A1* | 3/2019 | Amacker | B25J 9/0003 |
| 2019/0308320 A1* | 10/2019 | Konishi | G06V 20/64 |
| 2019/0329423 A1* | 10/2019 | Shimodaira | B25J 13/06 |
| 2020/0023521 A1* | 1/2020 | Dan | B25J 9/1692 |
| 2020/0042656 A1* | 2/2020 | Zapolsky | G06V 20/10 |
| 2020/0147787 A1* | 5/2020 | Takahashi | B25J 13/085 |
| 2020/0363459 A1* | 11/2020 | Kawano | G01R 27/2605 |
| 2021/0229273 A1* | 7/2021 | Kanai | B25J 9/162 |
| 2021/0229275 A1* | 7/2021 | Komaike | B25J 9/1697 |
| 2021/0252714 A1* | 8/2021 | Hayashi | B25J 13/00 |
| 2021/0394362 A1* | 12/2021 | Sodeyama | B25J 9/163 |
| 2022/0266454 A1* | 8/2022 | Sato | B25J 15/04 |

FOREIGN PATENT DOCUMENTS

| | | |
|---|---|---|
| JP | 201777614 A | 4/2017 |
| JP | 2018202559 A | 12/2018 |
| JP | 2019188542 A | 10/2019 |
| JP | 2019214105 A | 12/2019 |
| WO | 2018214156 A1 | 11/2018 |

* cited by examiner

DEVICE FOR CORRECTING ROBOT TEACHING POSITION, TEACHING DEVICE, ROBOT SYSTEM, TEACHING POSITION CORRECTION METHOD, AND COMPUTER PROGRAM

RELATED APPLICATIONS

The present application is a National Phase of International Application No. PCT/JP2021/013092 filed Mar. 26, 2021, which claims priority to Japanese Application No. 2020-067082, filed Apr. 2, 2020.

TECHNICAL FIELD

The present invention relates to a device for correcting a teaching position of a robot, a teaching device, a robot system, a teaching position correction method, and a computer program.

BACKGROUND ART

A device for correcting a teaching position of a robot has been known (e.g., PTL 1).

CITATION LIST

Patent Literature

PTL 1: JP 2018-202559 A

SUMMARY OF INVENTION

Technical Problem

In the related art, a technique for further simplifying a task involved in a teaching position correction of a robot has been demanded.

Solution to Problem

In one aspect of the present disclosure, a device configured to correct a teaching position of a robot when an arrangement of a workpiece with respect to the robot changes, by using an index arranged at a predetermined position with respect to the workpiece, includes a first position data acquisition section configured to acquire first position data of the robot when a hand-tip portion of the robot is arranged in a predetermined positional relationship with the index in a state where the hand-tip portion is arranged at a first orientation, before change of the arrangement of the workpiece, a second position data acquisition section configured to acquire second position data of the robot when the hand-tip portion is arranged in the predetermined positional relationship with the index in a state where the hand-tip portion is arranged at the first orientation, after the change of the arrangement of the workpiece, an orientation change data acquisition section configured to acquire orientation change data indicating a change amount in an orientation of the workpiece with respect to the robot due to the change of the arrangement, based on the first position data and the second position data, a third position data acquisition section configured to acquire third position data of the robot when the hand-tip portion is arranged in the predetermined positional relationship with the index in a state where the hand-tip portion is arranged at a second orientation which is corrected from the first orientation by using the orientation change data, and a position change data acquisition section configured to acquire position change data indicating a change amount in a position of the workpiece with respect to the robot due to the change of the arrangement, based on the first position data and the third position data.

In another aspect of the present disclosure, a method of correcting a teaching position of a robot when an arrangement of a workpiece with respect to the robot changes, by using an index arranged at a predetermined position with respect to the workpiece, includes acquiring first position data of the robot when a hand-tip portion of the robot is arranged in a predetermined positional relationship with the index in a state where the hand-tip portion is arranged at a first orientation, before change of the arrangement of the workpiece, acquiring second position data of the robot when the hand-tip portion is arranged in the predetermined positional relationship with the index in a state where the hand-tip portion is arranged at the first orientation, after the change of the arrangement of the workpiece, acquiring orientation change data indicating a change amount in an orientation of the workpiece with respect to the robot due to the change of the arrangement, based on the first position data and the second position data, acquiring third position data of the robot when the hand-tip portion is arranged in the predetermined positional relationship with the index in a state where the hand-tip portion is arranged at a second orientation which is corrected from the first orientation by using the orientation change data, and acquiring position change data indicating a change amount in a position of the workpiece with respect to the robot due to the change of the arrangement, based on the first position data and the third position data.

In still another aspect of the present disclosure, a computer program for correcting a teaching position of a robot when an arrangement of a workpiece with respect to the robot changes, by using an index arranged at a predetermined position with respect to the workpiece, causes a computer to function as a first position data acquisition section configured to acquire first position data of the robot when a hand-tip portion of the robot is arranged in a predetermined positional relationship with the index in a state where the hand-tip portion is arranged at a first orientation, before change of the arrangement of the workpiece, a second position data acquisition section configured to acquire second position data of the robot when the hand-tip portion is arranged in the predetermined positional relationship with the index in a state where the hand-tip portion is arranged at the first orientation, after the change of the arrangement of the workpiece, an orientation change data acquisition section configured to acquire orientation change data indicating a change amount in an orientation of the workpiece with respect to the robot due to the change of the arrangement, based on the first position data and the second position data, a third position data acquisition section configured to acquire third position data of the robot when the hand-tip portion is arranged in the predetermined positional relationship with the index in a state where the hand-tip portion is arranged at a second orientation which is corrected from the first orientation by using the orientation change data, and a position change data acquisition section configured to acquire position change data indicating a change amount in a position of the workpiece with respect to the robot due to the change of the arrangement, based on the first position data and the third position data.

Effects of Invention

According to the present disclosure, position change data for a teaching position correction can be acquired with third position data without performing an actual machine touch-up operation. Therefore, a task involved in a teaching position correction can be simplified.

DESCRIPTION OF EMBODIMENTS

Figure 1:
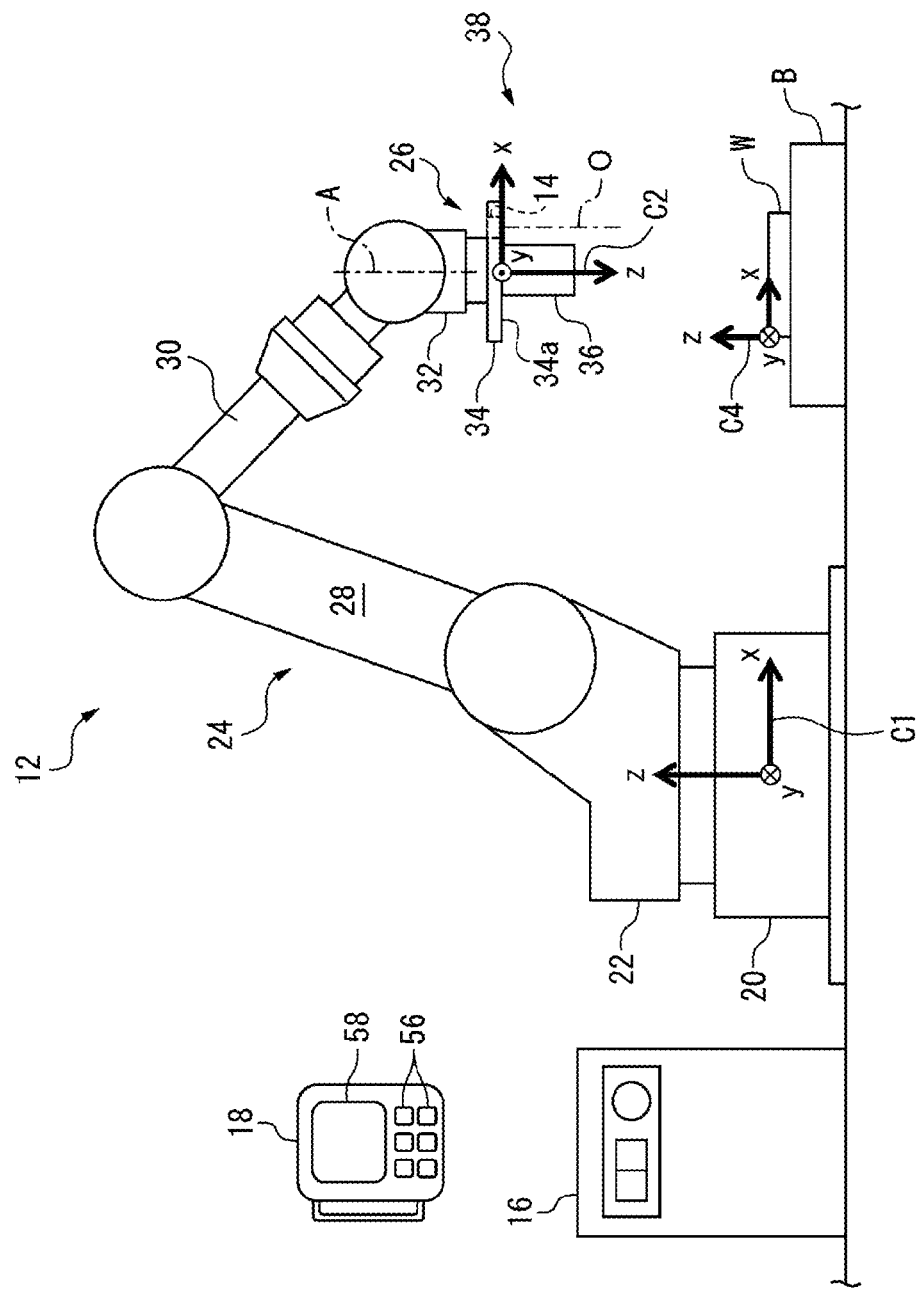
FIG. 1 is a diagram of a robot system according to an embodiment.

Hereinafter, embodiments of the present disclosure will be described in detail with reference to the drawings. Note that in various embodiments described below, the same elements are denoted by the same reference signs, and redundant description will be omitted. First, a robot system 10 according to an embodiment will be described with reference to FIG. 1 to FIG. 4. The robot system 10 includes a robot 12, a vision sensor 14, a control device 16, and a teaching device 18.

In the present embodiment, the robot 12 is a vertical articulated robot, and includes a robot base 20, a rotating torso 22, a robot arm 24, and a wrist 26. The robot base 20 is fixed on a floor of a work cell. The rotating torso 22 is provided on the robot base 20 to be pivotable about a vertical axis. The robot arm 24 includes a lower arm 28 rotatable about a horizontal axis and provided on the rotating torso 22, and an upper arm 30 rotatably provided on a tip part of the lower arm 28.

The wrist 26 includes a wrist base 32 rotatably coupled to a tip part of the upper arm 30, and a wrist flange 34 rotatable about an axis line A is provided on the wrist base 32. The wrist flange 34 is a cylindrical member having the axis line A as a central axis, and includes an attachment surface 34a on a tip side thereof.

An end effector 36 for performing a task on a workpiece is removably attached to the attachment surface 34a. The end effector 36 is, for example, a robot hand, a welding gun, a laser machining head, a coating material applicator, or the like, and performs a predetermined task (work-handling, welding, laser machining, coating, etc.) on a workpiece W. The wrist flange 34 and the end effector 36 attached to the tip side of the wrist flange 34 constitute a hand-tip portion 38 of the robot 12.

Figure 2:
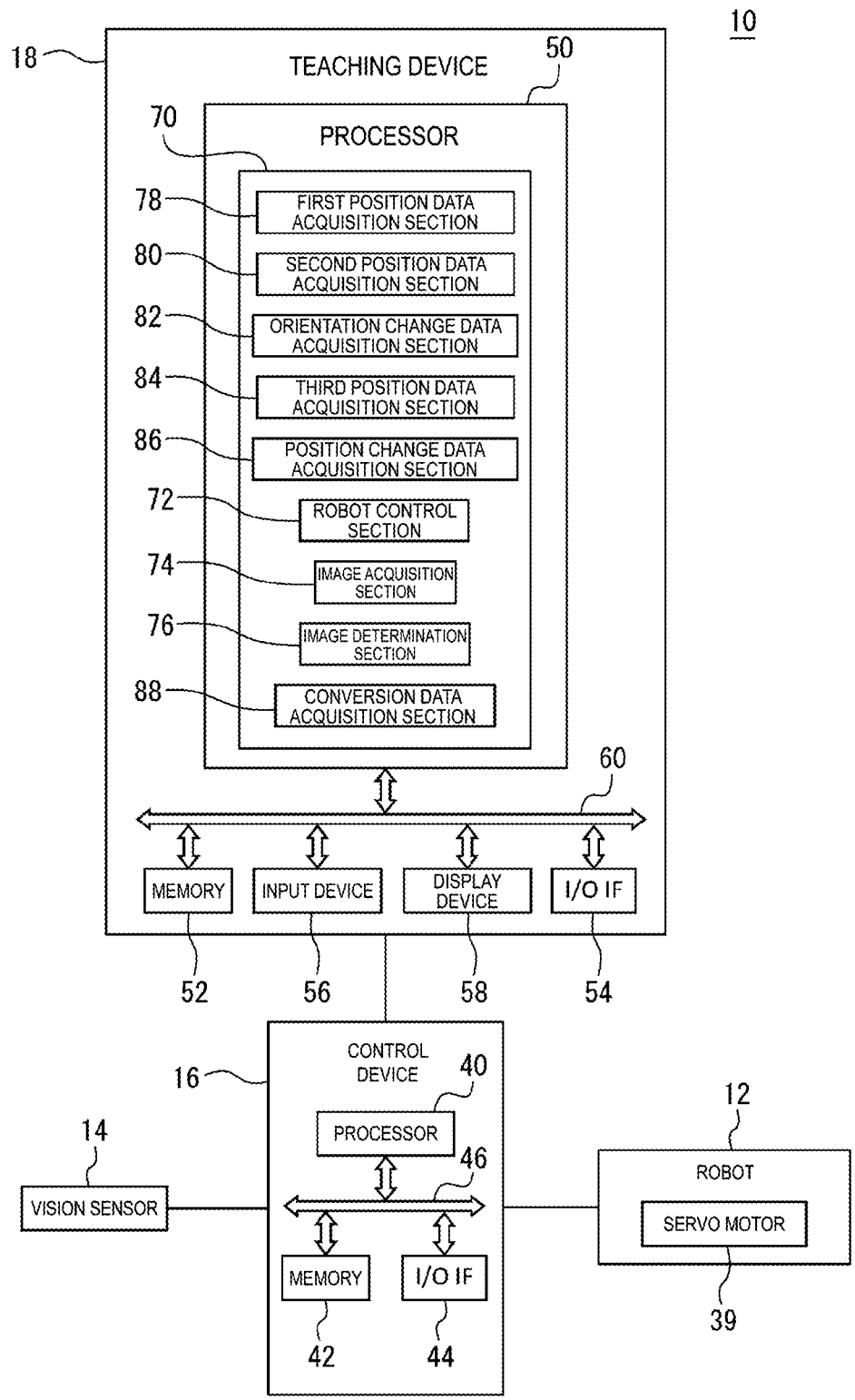
FIG. 2 is a block diagram of the robot system illustrated in FIG. 1.

Each of the components (i.e., the robot base 20, rotating torso 22, the robot arm 24, and the wrist 26) of the robot 12 includes a servo motor 39 inside (FIG. 2). The servo motors 39 each drive the corresponding movable component (i.e., the rotating torso 22, the robot arm 24, and the wrist 26) of the robot 12 in response to a command from the control device 16.

A robot coordinate system C1 (FIG. 1) is set in the robot 12. The robot coordinate system C1 is a coordinate system for automatically controlling an operation of each movable component of the robot 12, and is fixed in a three-dimensional space. In the present embodiment, the robot coordinate system C1 is set with respect to the robot 12 such that its origin is arranged at the center of the robot base 20 and its z-axis coincides with a rotating axis of the rotating torso 22.

Figure 3:
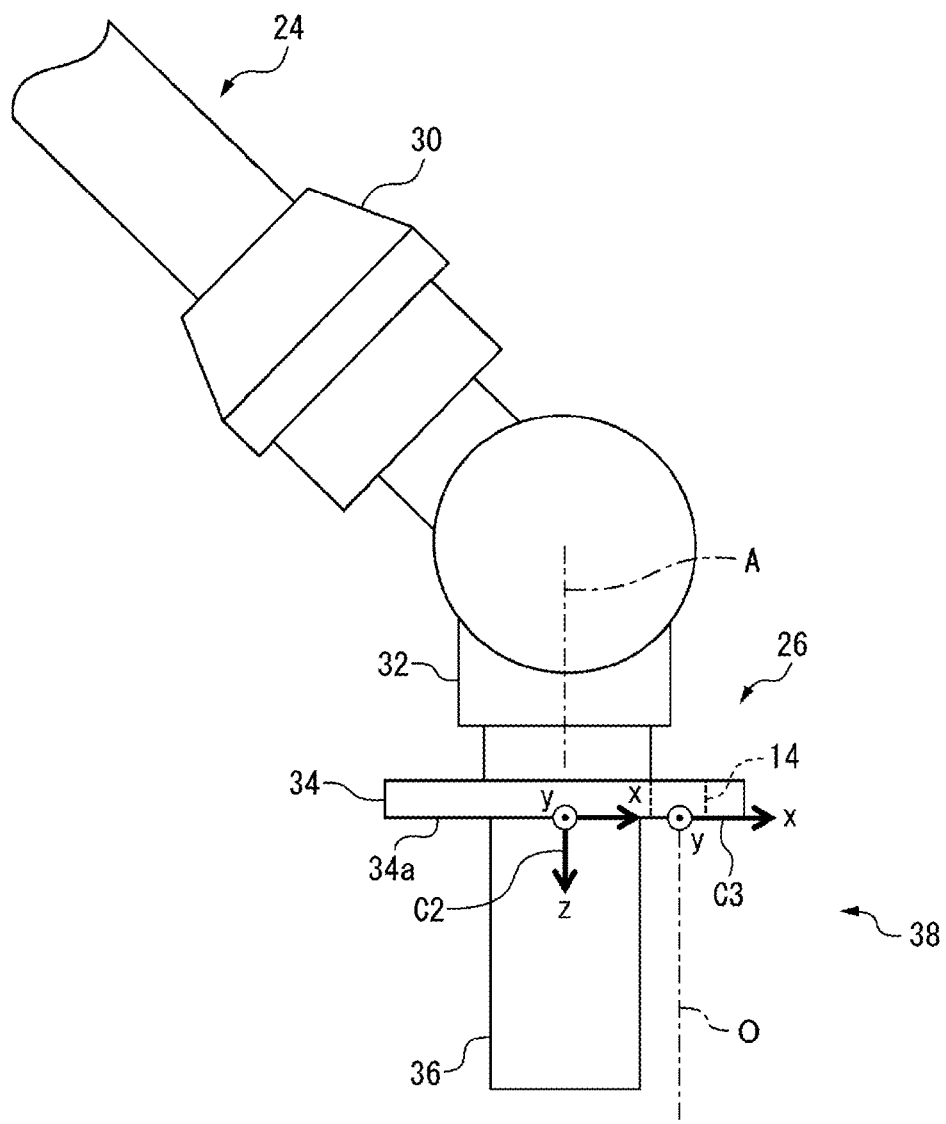
FIG. 3 is an enlarged diagram of a hand-tip portion illustrated in FIG. 1.
Figure 4:
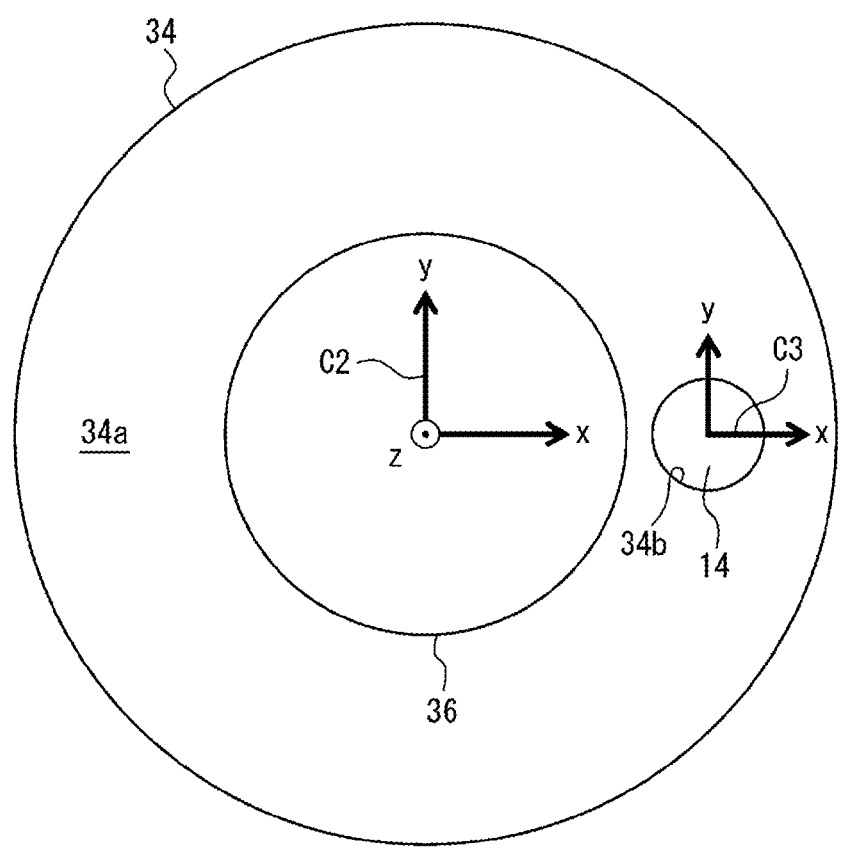
FIG. 4 is a diagram of the hand-tip portion illustrated in FIG. 3 as seen from a positive direction of a z-axis of an MIF coordinate system.

On the other hand, as illustrated in FIGS. 1, 3 and 4, a mechanical interface (hereinafter abbreviated as "MIF") coordinate system C2 is set in the hand-tip portion 38. The MIF coordinate system C2 is a coordinate system for controlling a position and an orientation of the hand-tip portion 38 (i.e., the end effector 36) in the robot coordinate system C1.

In the present embodiment, the MIF coordinate system C2 is set with respect to the hand-tip portion 38 such that its origin is arranged at the center of the attachment surface 34a of the wrist flange 34 and its z-axis coincides with the axis line A. When the hand-tip portion 38 is moved, a processor 40 sets the MIF coordinate system C2 in the robot coordinate system C1, and controls each servo motor 39 of the robot 12 such that the hand-tip portion 38 is arranged at a position and an orientation represented by the set MIF coordinate system C2. In this way, the processor 40 can position the hand-tip portion 38 in any position and any orientation in the robot coordinate system C1.

The vision sensor 14 is, for example, a camera or a three-dimensional vision sensor, and includes an optical system (a focusing lens, a focus lens, etc.) and an imaging sensor (a CCD, a CMOS, etc.). The vision sensor 14 images an object and transmits the imaged image data to the control device 16. The vision sensor 14 is fixed in a predetermined position with respect to the hand-tip portion 38.

More specifically, as illustrated in FIG. 4, the vision sensor 14 is provided in the wrist flange 34 in a built-in manner and fixed immovably, and is arranged such that a subject image is incident on the optical system of the vision sensor 14 along an optical axis O through an opening 34b formed in the attachment surface 34a. A sensor coordinate system C3 is set in the vision sensor 14.

The sensor coordinate system C3 is a coordinate system for defining coordinates of each pixel of the image data imaged by the vision sensor 14, and is set with respect to the vision sensor 14 such that its x-y plane is orthogonal to the optical axis O of the vision sensor 14. Here, in the present embodiment, a positional relationship between the MIF coordinate system C2 and the sensor coordinate system C3 is not calibrated and is assumed to be unknown.

The control device 16 controls an operation of the robot 12 and the vision sensor 14. Specifically, the control device 16 is a computer including the processor 40, a memory 42, and an I/O interface 44. The processor 40 includes a CPU, a GPU, or the like, and is communicably connected to the memory 42 and the I/O interface 44 via a bus 46. While communicating with the memory 42 and the I/O interface 44, the processor 40 transmits a command to the robot 12 and the vision sensor 14 and controls an operation of the robot 12 and the vision sensor 14.

The memory 42 includes a RAM, a ROM, or the like, and stores various types of data temporarily or permanently. The I/O interface 44 includes, for example, an Ethernet (trade name) port, a USB port, a fiber optic connector, a HDMI (trade name) terminal, or the like, and communicates data to or from an external equipment through wireless or wired communications under a command from the processor 40. The servo motor 39 and the vision sensor 14 described above are communicably connected to the I/O interface 44 by wired or wireless manner.

The teaching device 18 is, for example, a hand-held device (a teaching pendant or portable equipment such as tablet portable equipment) used to teach the robot 12 an operation for executing a predetermined task. Specifically, the teaching device 18 is a computer including a processor 50, a memory 52, an I/O interface 54, an input device 56, and a display device 58. The processor 50 includes a CPU, a GPU, or the like, and is communicably connected to the memory 52, the input device 56, the display device 58, and the I/O interface 54 via a bus 60.

The memory 52 includes a RAM, a ROM, or the like, and stores various types of data temporarily or permanently. The I/O interface 54 includes, for example, an Ethernet (trade name) port, a USB port, a fiber optic connector, a HDMI (trade name) terminal, or the like, and communicates data to or from an external equipment through wireless or wired communications under a command from the processor 50. The I/O interface 54 is connected to the I/O interface 44 of the control device 16, and the control device 16 and the teaching device 18 can communicate with each other.

The input device 56 includes a push button, a switch, a touch panel, or the like, accepts input from an operator, and transmits input information to the processor 50. The display device 58 includes an LCD, an organic EL display, or the like, and displays various types of information under a command from the processor 50. The operator can perform a jog operation on the robot 12 by operating the input device 56, and teach the robot 12 an operation.

By teaching the robot 12, the operator can construct a work program WP for causing the robot 12 to execute a predetermined task. In the work program WP, a teaching position TP0 in which the hand-tip portion 38 (specifically, the end effector 36) of the robot 12 needs to be positioned for a task is defined. The work program WP is stored in the memories 42 and 52 in advance.

The processor 50 transmits a command for operating the robot 12 to the control device 16, and the processor 40 of the control device 16 controls the robot 12 in response to a command from the teaching device 18. In this way, the processor 50 can control an operation of the robot 12 via the control device 16.

Figure 5:
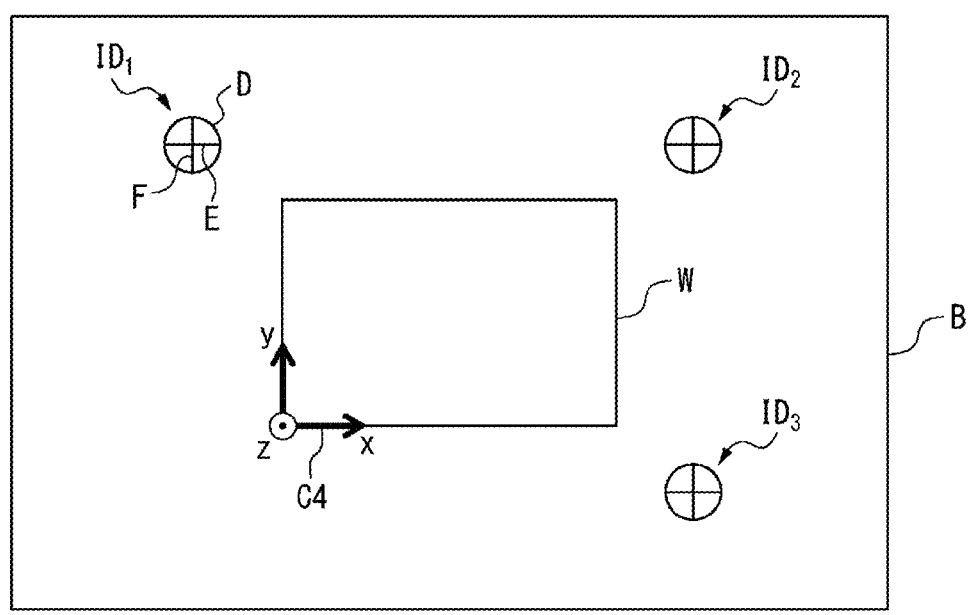
FIG. 5 is a diagram for explaining a workpiece and an index according to an embodiment.

As illustrated in FIGS. 1 and 5, in the present embodiment, the workpiece W being a task target of the robot 12 is fixed in a predetermined position of a holding structure B by a jig (not illustrated) or the like. A workpiece coordinate system C4 is set in the work piece W. The workpiece coordinate system C4 is a coordinate system for defining a position and an orientation of the workpiece W in the robot coordinate system C1, and is fixed with respect to the workpiece W (or the robot coordinate system C1). In the present embodiment, the workpiece coordinate system C4 is arranged with respect to the workpiece W such that its origin is arranged at one vertex angle of a top face of the workpiece W and its x-y plane is parallel to the top face of the workpiece W.

Here, the robot 12, the workpiece W, and the holding structure B may be transferred to another manufacturing line, or at least one of the robot 12, the workpiece W, and the holding structure B may be replaced. In such a case, there is a possibility that an arrangement of the workpiece W with respect to the robot 12 (or the robot coordinate system C1) changes, and, as a result, a task cannot be accurately executed on a target position on the workpiece W even when the robot 12 is operated according to the work program WP and the hand-tip portion 38 is positioned at the teaching position $TP_0$.

Thus, in the present embodiment, the teaching device 18 corrects the teaching position $TP_0$ of the robot 12 defined in the work program WP by using indices $ID_1$, $ID_2$, and $ID_3$ arranged at a predetermined position with respect to the workpiece W. As illustrated in FIG. 5, in the present embodiment, a total of three indices $ID_1$, $ID_2$, and $ID_3$ are provided on a top face of the holding structure B.

Each of the first index $ID_1$, the second index $ID_2$, and the third index $ID_3$ is formed of a circular line D and two straight lines E and F orthogonal to each other. The indices $ID_1$, $ID_2$, and $ID_3$ are provided to the holding structure B as a visually recognizable feature such as, for example, a pattern using a coating material or an engraving (unevenness) formed on the top face of the holding structure B.

Next, an operation flow of the teaching device 18 will be described. First, the processor 50 of the teaching device 18 executes an advance flow illustrated in FIG. 6 before an arrangement of the robot 12 and the workpiece W changes (i.e., the robot 12, the workpiece W, or the holding mechanism B is transferred or replaced). The advance flow illustrated in FIG. 6 starts when the processor 50 receives an advance flow start command from an operator, a host controller, or a computer program CP for a teaching position correction.

In step S1, the processor 50 sets a number "n" (in the present embodiment, n=1, 2, 3) that specifies an n-th index $ID_n$ to "1". In step S2, the processor 50 executes processing of arranging the hand-tip portion 38 in a predetermined positional relationship with the n-th index $ID_n$. Step S2 will be described with reference to FIG. 7.

In step S11, the processor 50 arranges the hand-tip portion 38 in an initial position $P_{A\_n}$ with respect to the n-th index $ID_n$ and a first orientation OR1. Here, the initial position $P_{A\_n}$ is predetermined as a position of the hand-tip portion 38 in which the n-th index $ID_n$ falls within a field of vision of the vision sensor 14. Further, the first orientation OR1 is defined as coordinates (W1, P1, R1) of the robot coordinate system C1.

Herein, the coordinate W1 indicates an angle about the x-axis of the robot coordinate system C1, the coordinate P1 indicates an angle about the y-axis of the robot coordinate system C1, and the coordinate R1 indicates an angle about the z-axis of the robot coordinate system C1. Data of the initial position $P_{A\_n}$ and the first orientation OR1 (i.e., the coordinates of the robot coordinate system C1) is defined in the computer program CP.

The processor 50 controls the robot 12 via the control device 16, operates the robot 12, and arranges the hand-tip portion 38 in the initial position $P_{A\_n}$ and the first orientation OR1. At this time, the vision sensor 14 moves along with the hand-tip portion 38 by the robot 12, and is arranged at a position in which the n-th index $ID_n$ falls within the field of vision.

If n=1 is set at a point in time at which step S11 starts, the processor 50 operates the robot 12, and arranges the hand-tip portion 38 in the initial position $P_{A\_1}$ with respect to the first index $ID_1$ and in the first orientation OR1. In this way, in the present embodiment, the processor 50 functions as a robot control section 72 (FIG. 2) that controls an operation of the robot 12 so as to move the hand-tip portion 38 and the vision sensor 14.

Figure 8:
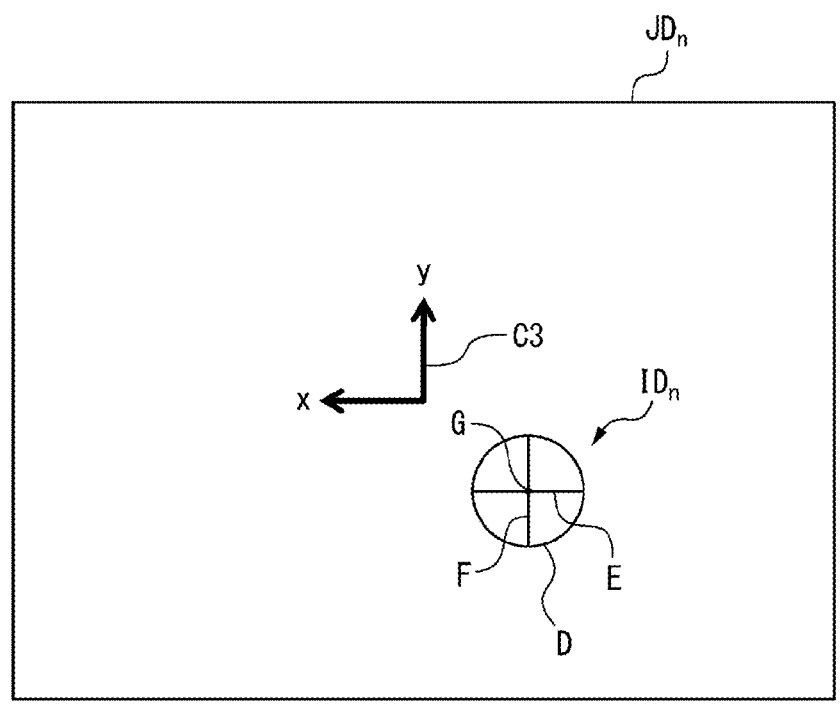
FIG. 8 illustrates an example of image data imaged by a vision sensor in step S12 in FIG. 7.

In step S12, the processor 50 operates the vision sensor 14, and images the n-th index $ID_n$. An example of image data $JD_n$ imaged by the vision sensor 14 is illustrated in FIG. 8. As illustrated in FIG. 8, in the present embodiment, the origin of the sensor coordinate system C3 is arranged at the center (specifically, a pixel arranged at the center) of the image data $JD_n$.

The processor 50 acquires the image data $JD_n$ from the vision sensor 14 via the control device 16, and stores the image data in the memory 52. Therefore, the processor 50 functions as an image acquisition section 74 (FIG. 2) that acquires the image data $JD_n$ in which the vision sensor 14 images the n-th index $ID_n$. Note that the processor 50 may directly acquire the image data $JD_n$ from the vision sensor 14 not via the control device 16. In this case, the I/O interface 54 may be communicably connected to the vision sensor 14 by wired or wireless manner.

In step S13, the processor 50 determines whether a position $IP_n$ of the n-th index $ID_n$ is arranged at a predetermined target position PO and a size $SZ_n$ of the n-th index $ID_n$ coincides with a predetermined target value TS in the image data $JD_n$ acquired in most recent step S12.

Specifically, the processor 50 analyzes the acquired image data $JD_n$, and specifies an intersection point G of the straight lines E and F of the n-th index $ID_n$ imaged in the image data $JD_n$. Then, the processor 50 acquires, as data indicating the position $IP_n$, coordinates (x, y) of the intersection point G in the sensor coordinate system C3. Here, in the present embodiment, the target position PO is set as the origin of the sensor coordinate system C3.

As an example, the processor 50 determines that the position $IP_n$ is arranged at the target position PO when the x coordinate of the position $IP_n$ in the sensor coordinate system C3 falls within a range of $-x_{th} \leq x \leq x_{th}$ (i.e., a range $[-x_{th}, x_{th}]$) and they coordinate falls within a range of $-y_{th} \leq y \leq y_{th}$ (i.e., a range $[-y_{th}, y_{th}]$). As another example, the processor 50 calculates a distance $\delta_G = (x^2+y^2)^{1/2}$ between the origin of the sensor coordinate system C3 and the intersection point G, and determines that the position $IP_n$ is arranged at the target position PO when the distance $\delta_G$ is equal to or less than a threshold value $\delta_{Gth}$.

In this way, in the present embodiment, the processor 50 functions as an image determination section 76 (FIG. 2) that determines whether the position $IP_n$ of the n-th index $ID_n$ is arranged at the target position PO in the image data $JD_n$. Note that the target position PO may be set at any position: coordinates (x0, y0), other than the origin of the sensor coordinate system C3. In this case, the above-described ranges $[-x_{th}, x_{th}]$ and $[-y_{th}, y_{th}]$ may be set as $[-x_{th}+x_0, x_{th}+x_0]$ and $[-y_{th}+y_0, y_{th}+y_0]$.

Further, the processor 50 analyzes the image data $JD_n$, and specifies the circle D of the n-th index $ID_n$ imaged in the image data $JD_n$. Then, the processor 50 acquires, as data indicating the size $SZ_n$, an area of the circle D (or the number of pixels included in an image region of the circle D) in the sensor coordinate system C3. Then, the processor 50 determines that the size $SZ_n$, coincides with the target value TS when the size $SZ_n$ falls within a predetermined range (e.g., [0.95×TS, 1.05×TS]) with reference to the target value TS.

Figure 6:
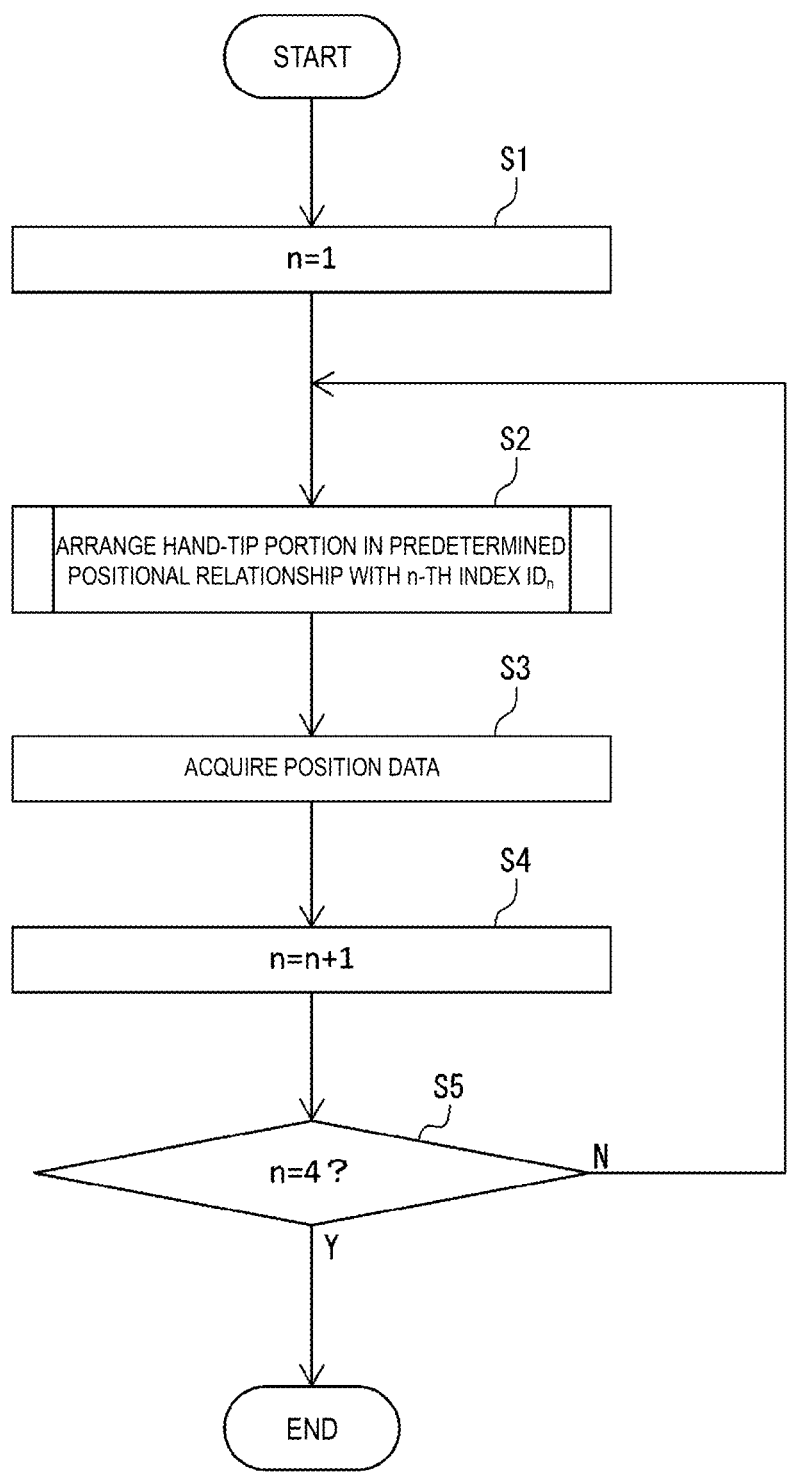
FIG. 6 is a flowchart illustrating an example of an advance flow.
Figure 7:
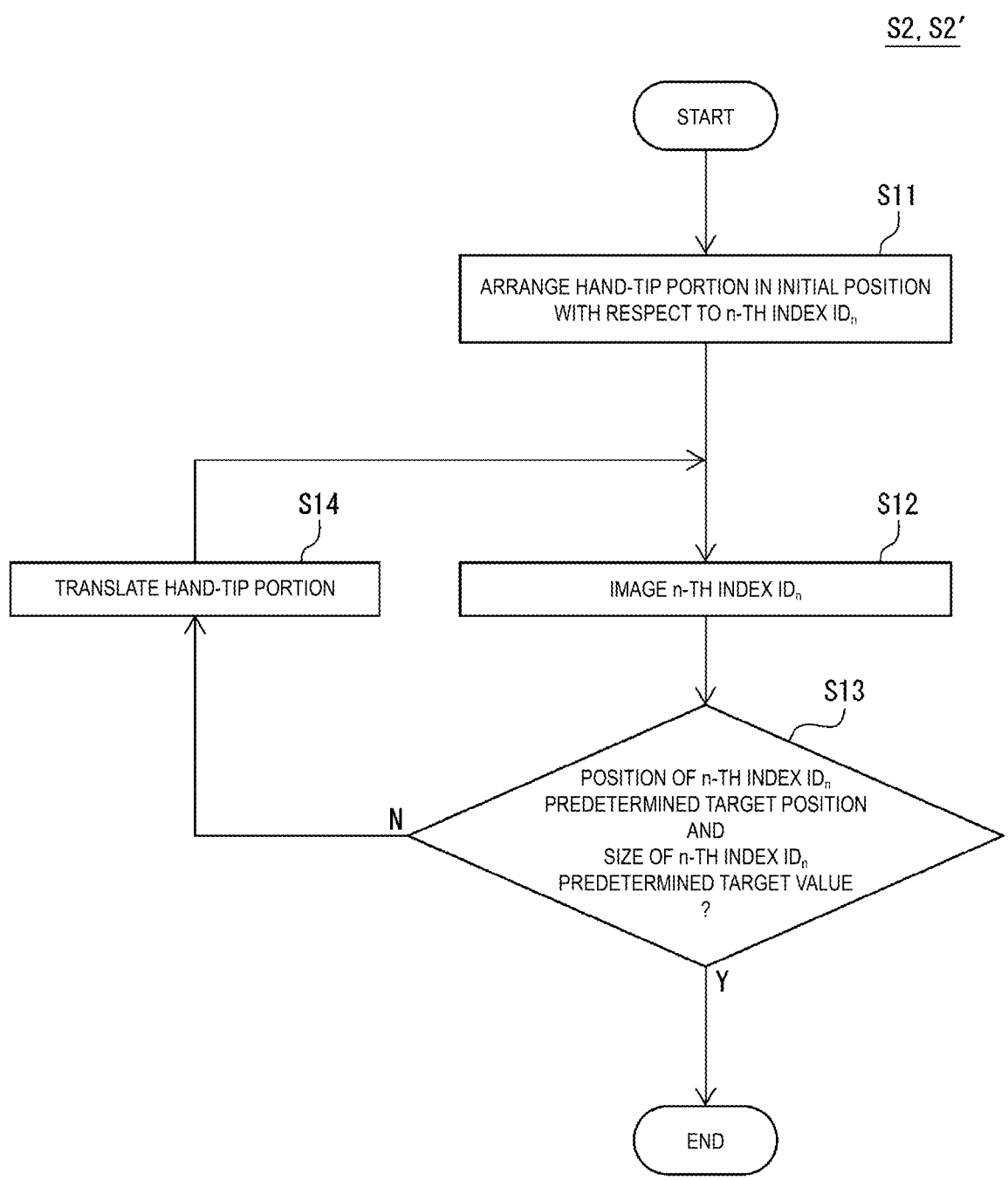
FIG. 7 is a flowchart illustrating an example of a flow of step S2 in FIG. 6 and a flow of step S2' in FIG. 10.

In step S13, the processor 50 determines YES when the position $IP_n$ is arranged at the target position PO and the size $SZ_n$ coincides with the target value TS, and ends step S2 in FIG. 7, and the processing proceeds to step S3 in FIG. 6. On the other hand, the processor 50 determines NO when the position $IP_n$ is not arranged at the target position PO or the size $SZ_n$ does not coincide with the target value TS, and the processing proceeds to step S14.

When YES is determined in step S13, the hand-tip portion 38 is arranged in a predetermined positional relationship with the n-th index $ID_n$ in a state where the hand-tip portion 38 is arranged at the first orientation OR1. The predetermined positional relationship is a positional relationship between the hand-tip portion 38 and the n-th index $ID_n$ when the vision sensor 14 images the image data $JD_n$ in which YES is determined in step S13. In other words, in a state where the hand-tip portion 38 is arranged at the first orientation OR1, the hand-tip portion 38 is arranged in a positional relationship with the n-th index $ID_n$ in which the optical axis O of the vision sensor 14 passes through the intersection point G and the vision sensor 14 is separated from the intersection point G by a predetermined distance.

In step S14, the processor 50 translates the hand-tip portion 38 in a direction H by a distance d in a state where the hand-tip portion 38 is arranged at the first orientation OR1. Here, in step S14 executed for the first time, the processor 50 may translate the hand-tip portion 38 by predetermined (or randomly selected) distance d0 and direction $H_0$.

Subsequently, the distance d and the direction H in which the hand-tip portion 38 is translated in step S14 executed for the second and subsequent times may be determined from a displacement amount and a direction of the n-th index $ID_n$ displaced in the sensor coordinate system C3 as a result of the translation in the image data $JD_n$ imaged in step S12 executed for the second and subsequent times.

Specifically, the processor 50 determines the distance d and the direction H such that the position $IP_n$ and the size $SZ_n$ can be brought closer to the target position PO and the target value TS, respectively. After step S14 is executed, the processing returns to step S12 and loops step S12 to step S14 until the processor 50 determines YES in step S13.

Again, with reference to FIG. 6, in step S3, the processor 50 acquires position data $PD_{1\_n}$ (first position data) of the robot 12 when the processor 50 determines YES in step S13. For example, at a point in time at which the processor 50 determines YES in step S13, the processor 50 acquires, as the position data $PD_{1\_n}$, coordinates $(x_{1\_n}, y_{1\_n}, z_{1\_n})$ of the origin of the MIF coordinate system C2 in the robot coordinate system C1, and stores the coordinates in the memory 52.

Note that the processor 50 may obtain coordinates $(x_{1\_n}, y_{1\_n}, z_{1\_n})$, based on a position feedback from a rotation detector (an encoder, a hall element, etc.) provided in each of the servo motors 39 of the robot 12. In this way, in the present embodiment, the processor 50 functions as a first position data acquisition section 78 (FIG. 2) that acquires the position data $PD_{1\_n}$ (first position data).

In step S4, the processor 50 increments the number "n" that specifies the n-th index $ID_n$ by "1" (n=n+1). In step S5, the processor 50 determines whether the number "n" that specifies the n-th index $ID_n$ is "4" (n=4). The number "4" is the number of a total of the index $ID_n$+1. The processor 50 determines YES when n=4 and ends the advance flow illustrated in FIG. 6, whereas the processor 50 determines NO when n≤3 holds and the processing returns to step S2. Then, the processing loops step S2 to S5 until the processor 50 determines YES in step S5.

At a point in time at which the advance flow in FIG. 6 ends, position data $PD_{1\_1}$ acquired for the first index ID1: coordinates $(x_{1\_1}, y_{1\_1}, z_{1\_1})$, position data $PD_{1\_2}$ acquired for the second index $ID_2$: coordinates $(x_{1\_2}, y_{1\_2}, z_{1\_2})$, and position data $PD_{1\_3}$ acquired for the third index $ID_3$: coordinates $(x_{1\_3}, y_{1\_3}, z_{1\_3})$ are acquired and stored in the memory 52.

Figure 9:
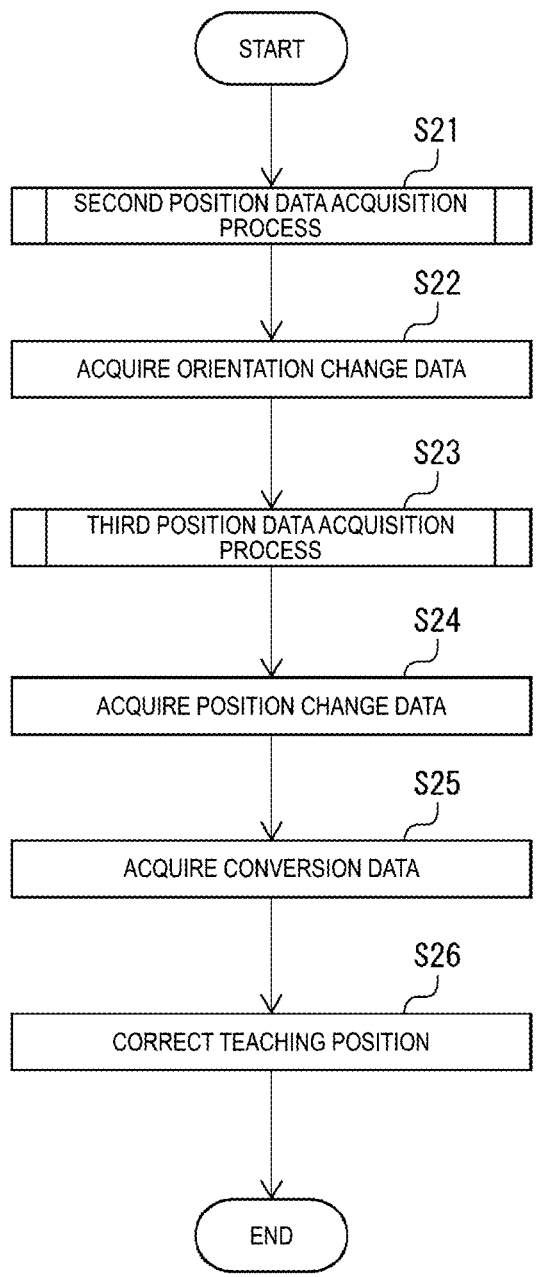
FIG. 9 is a flowchart illustrating an example of a teaching position correction flow.

After the arrangement of the robot 12 and the workpiece W is changed (i.e., the robot 12, the workpiece W, or the holding mechanism B is transferred or replaced), the processor 50 executes a teaching position correction flow illustrated in FIG. 9. Note that, in the same position before the change of arrangement as illustrated in FIG. 5, the first index ID1, the second index ID2, and the third index ID3 are also provided with respect to the workpiece W after the change of arrangement. The teaching position correction flow illustrated in FIG. 9 starts when the processor 50 receives a position correction flow start command from an operator, a host controller, or the computer program CP.

In step S21, the processor 50 executes a second position data acquisition process. The flow in step S21 is the same as the flow illustrated in FIG. 6. Specifically, the processor 50 executes steps S1 to S5 for the n-th index $ID_n$ after the change of arrangement. In step S3 executed in step S21, the processor 50 acquires position data $PD_{2\_n}$ (second position data) of the robot 12 when the hand-tip portion 38 is arranged in the above-described predetermined positional relationship (i.e., the positional relationship when YES is determined in step S13) with the n-th index $ID_1$ after the change of arrangement, in a state where the hand-tip portion 38 is arranged at the first orientation OR1.

As a result of step S21, position data $PD_{2\_1}$ acquired for the first index $ID_1$: coordinates $(x_{2\_1}, y_{2\_1}, z_{2\_1})$, position data $PD_{2\_2}$ acquired for the second index $ID_2$: coordinates $(x_{2\_2}, y_{2\_2}, z_{2\_2})$, and position data $PD_{2\_3}$ acquired for the third index $ID_3$: coordinates $(x_{2\_3}, y_{2\_3}, z_{2\_3})$ are acquired and stored in the memory 52. In this way, in the present embodiment, the processor 50 functions as a second position data acquisition section 80 (FIG. 2) that acquires the position data $PD_{2\_n}$ (second position data).

In step S22, the processor 50 acquires orientation change data, based on the position data $PD_{1\_n}$ and $PD_{2\_n}$. Specifically, the processor 50 first obtains the following matrix V1.

$$V1 = \begin{pmatrix} n_1 & o_1 & a_1 & 0 \\ 0 & 0 & 0 & 1 \end{pmatrix} \quad \text{[Equation 1]}$$

Here, $n_1$ can be obtained from an equation formed of $n_1=(PD_{1\_2}-PD_{1\_1})/|PD_{1\_2}-PD_{1\_1}|$ by using the above-described position data $PD_{1\_1}$ and $PD_{1\_2}$. $(PD_{1\_2}-PD_{1\_1})$ is a vector VT1 from the coordinates $(x_{1\_1}, y_{1\_1}, z_{1\_1})$ to the coordinates $(x_{1\_2}, y_{1\_2}, z_{1\_2})$, and $n_1$ represents a unit vector of the vector VT1.

Further, $a1$ can be obtained from an equation formed of $a1=r_1/|r_1|$. $r_1$ can be obtained from an equation formed of $r_1=(PD_{1\_3}-PD_{1\_1})\cdot n_1$ by using the above-described position data $PD_{1\_1}$ and $PD_{1\_3}$ and the unit vector n1. Here, $(PD_{1\_3}-PD_{1\_1})$ is a vector VT2 from the coordinates $(x_{1\_1}, y_{1\_1}, z_{1\_1})$ to the coordinates $(x_{1\_3}, y_{1\_3}, z_{1\_3})$, and $r_1$ is a vector orthogonal to the vector VT2 and the above-described unit vector $n_1$ (i.e., $r_1$ is an outer product of the vector VT2: $(PD_{2\_3}-PD_{2\_1})$ and the vector $n_1$). In this way, the processor 50 can calculate each parameter of the matrix V1, based on the position data $PD_{1\_n}$.

Next, the processor 50 obtains the following matrix V2.

$$V2 = \begin{pmatrix} n_2 & o_2 & a_2 & 0 \\ 0 & 0 & 0 & 1 \end{pmatrix} \quad \text{[Equation 2]}$$

Here, $n_2$ can be obtained from an equation formed of $n_2=(PD_{2\_2}-PD_{2\_1})/|PD_{2\_2}-PD_{2\_1}|$ by using the above-described position data $PD_{2\_1}$ and $PD_{2\_2}$. Here, $(PD_{2\_2}-PD_{2\_1})$ is a vector VT3 from the coordinates $(x_{2\_1}, y_{2\_1}, z_{2\_1})$ to the coordinates $(x_{2\_2}, y_{2\_2}, z_{2\_2})$, and $n_2$ represents a unit vector of the vector VT3.

Further, $a_2$ can be obtained from an equation formed of $a_2=r_2/|r_2|$. $r_2$ can be obtained from an equation formed of $r_2=(PD_{2\_3}-PD_{2\_1}) n_2$ by using the above-described position data $PD_{2\_1}$ and $PD_{2\_3}$ and the unit vector $n_2$.

Here, $(PD_{2\_3}-PD_{2\_1})$ is a vector VT4 from the coordinates $(x_{2\_1}, y_{2\_1}, z_{2\_1})$ to the coordinates $(x_{2\_3}, y_{2\_3}, z_{2\_3})$, and $r_2$ is a vector orthogonal to the vector VT4 and the above-described unit vector $n_2$ (i.e., $r_2$ is an outer product of the vector VT4: $(PD_{2\_3}-PD_{2\_1})$ and the vector $n_2$). In this way, the processor 50 can calculate each parameter of the matrix V2, based on the position data $PD_{2\_n}$.

Next, the processor 50 obtains a matrix M1 from an equation formed of $M1=inv(V2)\cdot V1$ by using the calculated matrices V1 and V2. The matrix M1 corresponds to orientation change data indicating a change amount in an orientation of the workpiece W with respect to the robot 12 (or the robot coordinate system C1) due to the change of arrangement. In this way, in the present embodiment, the processor 50 functions as an orientation change data acquisition section 82 (FIG. 2) that acquires the orientation change data M1, based on the position data $PD_{1\_n}$ and $PD_{2\_n}$.

In step S23, the processor 50 executes a third position data acquisition process. Step S23 will be described with reference to FIG. 10. In step S31, the processor 50 corrects the first orientation OR1. Specifically, the processor 50 obtains a second orientation OR2 (W2, P2, R2) of the hand-tip portion 38 by correcting the first orientation OR1 (W1, P1, R1) of the hand-tip portion 38 (or the tool coordinate system C2) by using the orientation change data M1.

Each of the coordinates (W2, P2, R2) of the second orientation OR2 can be obtained by converting the coordinates (W1, P1, R1) of the first orientation OR1 by the matrix M1 (=inv(V2) V1) obtained in step S22 (i.e., OR2=M1·OR1). The second orientation OR2 is an orientation of the hand-tip portion 38 (i.e., a direction of each axis of the tool coordinate system C2) corrected from the first orientation OR1 so as to accommodate a change amount in an orientation of the workpiece W with respect to the robot 12 (or the robot coordinate system C1) due to the change of arrangement.

Next, the processor 50 executes step S2'. Step S2' includes steps S11 to S14 illustrated in FIG. 7, but is different from above-described step S2 in the following points. Specifically, in step S2', the processor 50 executes steps S11 to S14 in a state where the hand-tip portion 38 is arranged at the second orientation OR2 after the correction is performed in step S31.

Specifically, in step S11, the processor 50 arranges the hand-tip portion 38 in the initial position $P_{A\_n}$ with respect to one index $ID_n$ in a state where the hand-tip portion 38 is arranged at the second orientation OR2. The one index $ID_n$ is one index selected from the three indices $ID_1$, $ID_2$, and $ID_3$, and may be specified in advance by an operator.

Next, the processor 50 executes steps S12 to S14 related to the one index $ID_n$ in a state where the hand-tip portion 38 is arranged at the second orientation OR2. As a result, the hand-tip portion 38 is arranged in a predetermined positional relationship with the one index $ID_n$ (i.e., a positional relationship between the hand-tip portion 38 and the one index $ID_1$ when the vision sensor 14 images the image data $JD_n$ in which YES is determined in step S13) in a state where the hand-tip portion 38 is arranged at the second orientation OR2.

Figure 10:
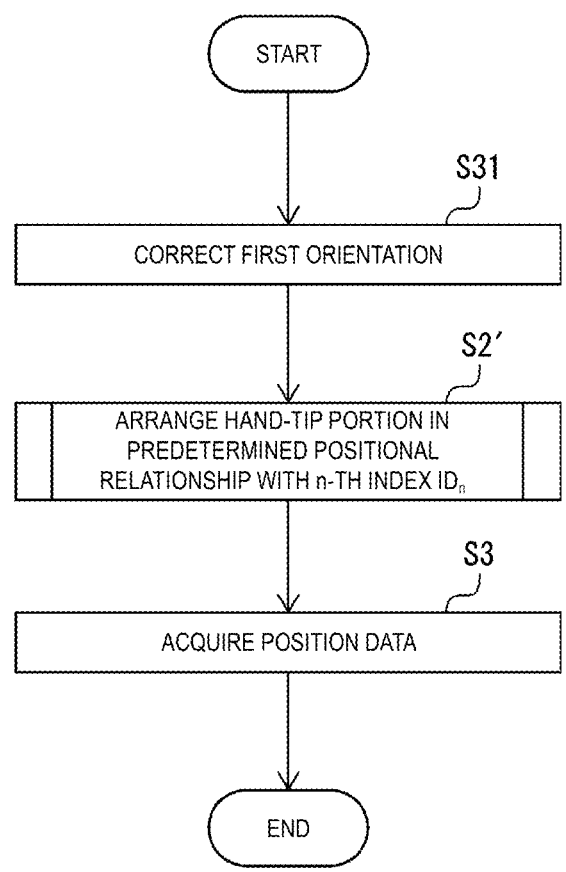
FIG. 10 is a flowchart illustrating an example of a flow of step S23 in FIG. 9.

Again, with reference to FIG. 10, after step S2' ends, the processor 50 executes step S3, and acquires position data $PD_{3\_n}$ (third position data) of the robot 12 at this time. Specifically, the processor 50 acquires, as the position data $PD_{3\_n}$, coordinates ($x_{3\_n}$, $y_{3\_n}$, $z_{3\_n}$) of the origin of the MIF coordinate system C2 in the robot coordinate system C1 at a point in time at which YES is determined in step S13 in step S2', and the processor 50 stores the coordinates in the memory 52.

In this way, in the present embodiment, the processor 50 functions as a third position data acquisition section 84 (FIG. 2) that acquires the third position data $PD_{3\_n}$ of the robot 12 when the hand-tip portion 38 is arranged in a predetermined positional relationship with one index $ID_n$ in a state where the hand-tip portion 38 is arranged at the second orientation OR2.

Again, with reference to FIG. 9, in step S24, the processor 50 acquires position change data, based on the position data $PD_{1\_n}$ (first position data) and $PD_{3\_n}$ (third position data). Specifically, the processor 50 obtains a matrix M2 from an equation formed of $M2=W_B inv(M1 \cdot W_A)$.

Here, $W_A$ is position orientation data representing the first position data $PD_{1\_n}$ acquired for one index $ID_n$ selected in above-described step S2', and the first orientation OR1. If the first index $ID_1$ is selected as the one index $ID_n$ in step S2', the position orientation data $W_A$ is represented as coordinates ($x_{1\_1}$, $y_{1\_1}$, $z_{1\_1}$, W1, P1, R1).

Further, $W_B$ is position orientation data representing the third position data $PD_{3\_n}$ acquired in step S3 in FIG. 10, and the second orientation OR2 acquired in step S31. If the first index $ID_1$ is selected as the one index $ID_n$, the position orientation data $W_B$ is represented as coordinates ($x_{3\_1}$, $y_{3\_1}$, $z_{3\_1}$, W2, P2, R2).

The matrix M2 corresponds to position change data indicating a change amount in a position of the workpiece W with respect to the robot 12 (the robot coordinate system C1) due to the change of arrangement. In this way, in the present embodiment, the processor 50 functions as a position change data acquisition section 86 (FIG. 2) that acquires the position change data M2, based on the position data $PD_{1\_n}$ and $PD_{3\_n}$.

In step S25, the processor 50 acquires, based on the orientation change data M1 and the position change data M2, conversion data for correcting the teaching position $T_0$ defined in the work program WP. Specifically, the processor 50 obtains, as the conversion data, a matrix M3 from an equation formed of $M3=M2 \cdot M1$. In this way, in the present embodiment, the processor 50 functions as a conversion data acquisition section 88 (FIG. 2) that acquires the conversion data M3, based on the orientation change data M1 and the position change data M2.

In step S26, the processor 50 corrects the teaching position $TP_0$. Specifically, the processor 50 converts the original teaching position $TP_0$ into a new teaching position TP1 with an equation formed of $TP_1=M3 \cdot TP_0$ by using the conversion data M3 acquired in step S25, and stores the teaching position in the memory 52. In this way, the processor 50 corrects the teaching position $TP_0$ defined in the work program WP in advance to the teaching position $TP_1$.

The corrected teaching position TP1 is acquired by canceling out a change amount in a position and an orientation of the workpiece W with respect to the robot 12 (the robot coordinate system C1) caused by the change of arrangement. In other words, a position and an orientation of the hand-tip portion 38 with respect to the workpiece W when the hand-tip portion 38 is positioned at the teaching position $TP_0$ before the change of arrangement, and a position and an orientation of the hand-tip portion 38 with respect to the workpiece W when the hand-tip portion 38 is positioned at the teaching position $TP_1$ after the change of arrangement can coincide with each other.

As described above, in the present embodiment, the processor 50 functions as the robot control section 72, the image acquisition section 74, the image determination section 76, the first position data acquisition section 78, the second position data acquisition section 80, the orientation change data acquisition section 82, the third position data acquisition section 84, the position change data acquisition section 86, and the conversion data acquisition section 88, and corrects the teaching position $TP_0$ by using the n-th index $ID_n$.

Thus, the robot control section 72, the image acquisition section 74, the image determination section 76, the first position data acquisition section 78, the second position data acquisition section 80, the orientation change data acquisition section 82, the third position data acquisition section 84, the position change data acquisition section 86, and the conversion data acquisition section 88 constitute a device 70 (FIG. 1) for correcting the teaching position $TP_0$ by using the n-th index $ID_n$.

According to the present embodiment, the position change data M2 needed for correcting the teaching position $TP_0$ is acquired based on the third position data $PD_{3\_1}$ acquired in a state where the hand-tip portion 38 is corrected in the second orientation OR2. According to this configuration, an actual machine touch-up operation by the actual robot 12, which has been necessary in the related art, can be made unnecessary.

The actual machine touch-up operation is an operation of bringing a tip of a pin attached to the hand-tip portion 38 into contact with a tip of a pin on the opponent side being fixed with respect to the holding structure B. In the related art including PTL 1 described above, in order to cause a robot to execute an actual task, it has been necessary to perform the actual machine touch-up operation after a matrix for a teaching position correction is acquired.

According to the present embodiment, by only acquiring the third position data $PD_{3\_n}$ in step S23 without performing the actual machine touch-up operation, the position change data M2 can be acquired, and a task of calibrating a positional relationship between the MIF coordinate system C2 and the sensor coordinate system C3 can also be made unnecessary. Therefore, a task involved in a teaching position correction can be simplified.

Further, according to the present embodiment, by only acquiring one piece of the position data $PD_{3\_n}$ related to the selected one index $ID_n$ in above-described step S23, the position change data M2 can be acquired. According to this configuration, a task process required for acquiring the position change data M2 can be reduced, and thus the process of the teaching position correction flow illustrated in FIG. 9 can be simplified, and thus the task involved in the teaching position correction can be simplified.

Further, in the present embodiment, the processor 50 executes above-described steps S2 and S2', and thus arranges the hand-tip portion 38 in a predetermined positional relationship with the n-th index $ID_n$ (i.e., a positional relationship between the hand-tip portion 38 and the index $ID_n$ when the vision sensor 14 images the image data $JD_n$ in which YES is determined in step S13) by using the image data $JD_n$ imaged by the vision sensor 14. According to this configuration, the hand-tip portion 38 can be accurately arranged in a predetermined positional relationship with a relatively simple algorithm.

Note that the processor 50 may execute the flow illustrated in FIGS. 6, 7, 9, and 10 according to the computer program CP. The computer program CP may be stored in advance in the memory 52. In this case, the computer program CP causes the processor 50 to function as the robot control section 72, the image acquisition section 74, the image determination section 76, the first position data acquisition section 78, the second position data acquisition section 80, the orientation change data acquisition section 82, the third position data acquisition section 84, the position change data acquisition section 86, and the conversion data acquisition section 88.

Note that, when a position and an orientation of the workpiece W are changed due to the change of arrangement, the processor 50 may correct the teaching position $TP_0$ in above-described step S26, and may also correct a position (origin position) and an orientation (direction of each axis) of the workpiece coordinate system C4 in the robot coordinate system C1, based on the orientation change data M1 and the position change data M2. In this way, the workpiece coordinate system C4 can be automatically and accurately set again with respect to the workpiece W after the change of arrangement.

Note that the vision sensor 14 may be a three-dimensional vision sensor that images an object and also measures a distance to the object, and may acquire the image data $JD_n$ by imaging the n-th index $ID_n$ in above-described step S12, and may also measure a distance k from the vision sensor 14 (origin of the sensor coordinate system C3) to the n-th index $ID_n$ (e.g., the intersection point G).

In this case, in above-described step S13, the processor 50 may determine whether the position $IP_n$ of the n-th index $ID_n$ is arranged at the target position PO in the most recently acquired image data $JD_n$ and the distance k falls within a predetermined range [$k_{th1}$, $k_{th2}$]. In this case, the hand-tip portion 38 can be arranged in a predetermined positional relationship with the n-th index $ID_n$ without using the size $SZ_n$ of the circle D of the index $ID_n$, and thus the circle D can be omitted from the index $ID_n$.

Further, the vision sensor 14 may be a laser scanner type three-dimensional sensor including an optical system (a laser diode, etc.) that emits light (e.g., laser light) along the optical axis O and an imaging sensor (a CCD, a CMOS, etc.) that receives and photoelectrically converts the light reflected by an object. Further, the vision sensor 14 may be constituted by a two-dimensional camera, and a laser device (e.g., a laser pointer) that can emit laser light may be further fixed with respect to the hand-tip portion 38 of the robot 12.

In this case, the vision sensor 14 may image the image data $JD_n$ in which an irradiation point of the laser light from the laser device is imaged together with the index $ID_n$ in above-described step S12, and the processor 50 may determine whether the irradiation point of the laser light is arranged on the intersection point G in step S13.

Alternatively, the vision sensor 14 may be omitted from the robot system 10, and in step S12, an operator may determine, by a visual check, whether an irradiation point of laser light from the above-described laser device (laser pointer) is arranged on the intersection point G of the index $ID_n$. Further, the operator may manually measure a distance from the laser device to the intersection point G at this time, and determine whether the distance falls within a predetermined target range.

Then, in step S14, the operator may operate the input device 56 of the teaching device 18, and manually perform a jog operation on the robot 12. In other words, in this case, steps S2 and S2' are executed by the operator. Even with such a method, the hand-tip portion 38 can be arranged in a predetermined positional relationship with the index $ID_n$. In this case, the robot control section 72, the image acquisition section 74, and the image determination section 76 can be omitted from the device 70.

Further, the conversion data acquisition section 88 can also be omitted from the device 70. For example, the teaching device 18 in a factory may be communicably connected to external equipment (e.g., a PC) located at a facility other than the factory via a communication network (the Internet, a LAN, etc.), and the teaching device 18 may transmit, to the external equipment, the orientation change data M1 and the position change data M2 acquired by the teaching device 18 functioning as the device 70. Then, at the other facility, an operator may operate the external equipment, and acquire the conversion data M3 by using the orientation change data M1 and the position change data M2 that are received from the teaching device 18.

Note that four or more indices $ID_n$ may be provided for the workpiece W. Further, the index ID is not limited to the artificial pattern as illustrated in FIG. 5, and any visual feature that can be visually recognized, such as a hole, an edge, or an uneven part formed in the holding structure B or the workpiece W, for example, may be used as an index. Further, an origin position and a direction of each axis of the robot coordinate system C1, the IMF coordinate system C2, the sensor coordinate system C3, or the workpiece coordinate system C4 are not limited to the above-described embodiment.

Further, as the first position data $PD_{1\_n}$, the second position data $PD_{2\_n}$, and the third position data $PD_{3\_n}$, not only the origin of the MIF coordinate system C2 but also position data of any point located in a known position with respect to the origin of the MIF coordinate system C2 (or the hand-tip portion 38) may be acquired. For example, a tool coordinate system C5 is set in a known position with respect to the MIF coordinate system C2.

The tool coordinate system C5 is a coordinate system for defining a position and an orientation of the end effector 36 in the robot coordinate system C1, and its origin is arranged at a work point of the end effector 36 (e.g., a workpiece gripping position of a robot hand, a welding point of a welding gun, a laser exit port of a laser machining head, a coating material exit port of a coating material applicator, etc.).

Coordinates of the origin of the tool coordinate system C5 in the robot coordinate system C1 can be represented as (x+α, y+β, z+γ) when coordinates of the origin of the MIF coordinate system C2 in the robot coordinate system C1 are (x, y, z). The processor 50 may acquire the coordinates of the origin of the tool coordinate system C5 as the first position data $PD_{1\_n}$, the second position data $PD_{2\_n}$, and the third position data $PD_{3\_n}$.

Note that, in the above-described embodiment, a case where the device 70 (i.e., the robot control section 72, the image acquisition section 74, the image determination section 76, the first position data acquisition section 78, the second position data acquisition section 80, the orientation change data acquisition section 82, the third position data acquisition section 84, the position change data acquisition section 86, and the conversion data acquisition section 88) is implemented, in the teaching device 18, as the function executed by the processor 50 is described. However, the device 70 may be implemented in the control device 16. Such an embodiment is illustrated in FIG. 11.

Figure 11:
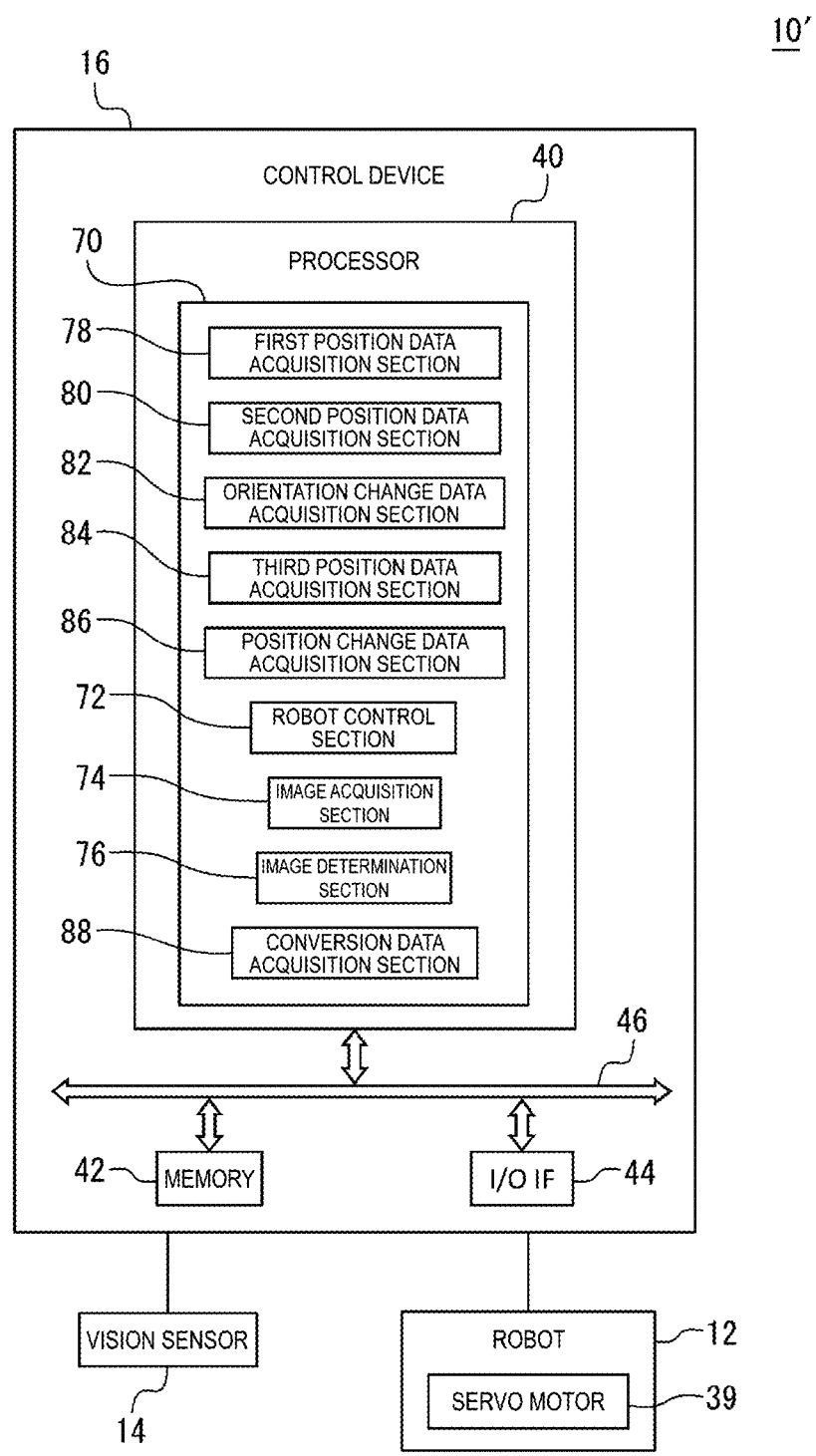
FIG. 11 is a block diagram of a robot system according to another embodiment.

In a robot system 10' illustrated in FIG. 11, the processor 40 of the control device 16 executes the flow illustrated in FIGS. 6, 7, 9, and 10, and functions as the robot control section 72, the image acquisition section 74, the image determination section 76, the first position data acquisition section 78, the second position data acquisition section 80, the orientation change data acquisition section 82, the third position data acquisition section 84, the position change data acquisition section 86, and the conversion data acquisition section 88.

In this case, the processor 40 may execute the flow illustrated in FIGS. 6, 7, 9, and 10 according to the computer program CP that is stored in the memory 42 in advance. Note that the robot system 10' may or may not include the teaching device 18. Further, the robot 12 is not limited to being the vertical articulated robot, and may be any other type of robot that can move the end effector 36, such as a horizontal articulated robot, or a parallel link robot, for example. In this case, the end effector 36 and the member (wrist flange 34) of the robot to which the end effector 36 is attached constitute the hand-tip portion 38. Although the present disclosure is described above through the embodiments, the above-described embodiments do not limit the invention according to the claims.

REFERENCE SIGNS LIST 10, 10' Robot system
12 Robot
14 Vision sensor
16 Control device
18 Teaching device
38 Hand-tip portion
40, 50 Processor
70 Device
72 Robot control section
74 Image acquisition section
76 Image determination section
78 First position data acquisition section
80 Second position data acquisition section
82 Orientation change data acquisition section
84 Third position data acquisition section
86 Position change data acquisition section
88 Conversion data acquisition section

The invention claimed is:

1. A device configured to correct a teaching position of a robot when an arrangement of a workpiece with respect to the robot changes, by using an index arranged at a predetermined position with respect to the workpiece, the device comprising a processor configured to:
acquire first position data of the robot when a hand-tip portion of the robot is arranged in a predetermined positional relationship with the index in a state where the hand-tip portion is arranged at a first orientation, before change of the arrangement of the workpiece;
acquire second position data of the robot when the hand-tip portion is arranged in the predetermined positional relationship with the index in the state where the hand-tip portion is arranged at the first orientation, after the change of the arrangement of the workpiece, the second position data being different from the first position data;
acquire orientation change data indicating a change amount in an orientation of the workpiece with respect to the robot due to the change of the arrangement, based on the first position data and the second position data;
acquire third position data of the robot when the hand-tip portion is arranged in the predetermined positional relationship with the index in a state where the hand-tip portion is arranged at a second orientation which is corrected from the first orientation by using the orientation change data;
acquire position change data indicating a change amount in a position of the workpiece with respect to the robot due to the change of the arrangement, based on the first position data and the third position data; and
control an operation of the robot, based on the orientation change data and the position change data.

2. The device of claim 1, wherein the processor is further configured to:
control the operation of the robot so as to move the hand-tip portion and a vision sensor fixed with respect to the hand-tip portion;
acquire image data in which the index is imaged by the vision sensor moved by the operation of the robot; and
determine whether a position of the index in the image data is arranged at a predetermined target position, and
wherein the predetermined positional relationship is a positional relationship between the hand-tip portion and the index when the vision sensor images the image data for which the processor determines that the position of the index is arranged at the target position.

3. The device of claim 1, wherein
a plurality of indices are arranged with respect to the workpiece, the plurality of indices including the index arranged at the predetermined position with respect to the workpiece, and
the processor is configured to:
acquire respective pieces of the first position data when the hand-tip portion is arranged in the predetermined positional relationship with respective indices among the plurality of indices, in the state where the hand-tip portion is arranged at the first orientation,
acquires acquire respective pieces of the second position data when the hand-tip portion is arranged in the predetermined positional relationship with the respective indices in the state where the hand-tip portion is arranged at the first orientation,
acquire the orientation change data, based on the respective pieces of the acquired first position data and the respective pieces of the acquired second position data,
acquire the third position data when the hand-tip portion is arranged in the predetermined positional relationship with one index of the plurality of indices in the state where the hand-tip portion is arranged at the second orientation, and
acquire the position change data, based on one piece of the first position data acquired for the one index and one piece of the acquired third position data.

4. The device of claim 1, wherein the processor is further configured to acquire conversion data for correcting the teaching position defined in a work program of the robot, based on the orientation change data and the position change data.

5. A teaching device of a robot, comprising a device configured to correct a teaching position of the robot when an arrangement of a workpiece with respect to the robot changes, by using an index arranged at a predetermined position with respect to the workpiece, wherein the device comprises a processor configured to:

acquire first position data of the robot when a hand-tip portion of the robot is arranged in a predetermined positional relationship with the index in a state where the hand-tip portion is arranged at a first orientation, before change of the arrangement of the workpiece;

acquire second position data of the robot when the hand-tip portion is arranged in the predetermined positional relationship with the index in the state where the hand-tip portion is arranged at the first orientation, after the change of the arrangement of the workpiece, the second position data being different from the first position data;

acquire orientation change data indicating a change amount in an orientation of the workpiece with respect to the robot due to the change of the arrangement, based on the first position data and the second position data;

acquire third position data of the robot when the hand-tip portion is arranged in the predetermined positional relationship with the index in a state where the hand-tip portion is arranged at a second orientation which is corrected from the first orientation by using the orientation change data;

acquire position change data indicating a change amount in a position of the workpiece with respect to the robot due to the change of the arrangement, based on the first position data and the third position data; and control an operation of the robot, based on the orientation change data and the position change data.

6. A robot system, comprising:

a robot; and a device configured to correct a teaching position of the robot when an arrangement of a workpiece with respect to the robot changes, by using an index arranged at a predetermined position with respect to the workpiece, wherein the device comprises a processor configured to:

acquire first position data of the robot when a hand-tip portion of the robot is arranged in a predetermined positional relationship with the index in a state where the hand-tip portion is arranged at a first orientation, before change of the arrangement of the workpiece;

acquire second position data of the robot when the hand-tip portion is arranged in the predetermined positional relationship with the index in the state where the hand-tip portion is arranged at the first orientation, after the change of the arrangement of the workpiece, the second position data being different from the first position data;

acquire orientation change data indicating a change amount in an orientation of the workpiece with respect to the robot due to the change of the arrangement, based on the first position data and the second position data;

acquire third position data of the robot when the hand-tip portion is arranged in the predetermined positional relationship with the index in a state where the hand-tip portion is arranged at a second orientation which is corrected from the first orientation by using the orientation change data;

acquire position change data indicating a change amount in a position of the workpiece with respect to the robot due to the change of the arrangement, based on the first position data and the third position data; and control an operation of the robot, based on the orientation change data and the position change data.

7. A method of correcting a teaching position of a robot when an arrangement of a workpiece with respect to the robot changes, by using an index arranged at a predetermined position with respect to the workpiece, the method comprising:

acquiring first position data of the robot when a hand-tip portion of the robot is arranged in a predetermined positional relationship with the index in a state where the hand-tip portion is arranged at a first orientation, before change of the arrangement of the workpiece;

acquiring second position data of the robot when the hand-tip portion is arranged in the predetermined positional relationship with the index in the state where the hand-tip portion is arranged at the first orientation, after the change of the arrangement of the workpiece, the second position data being different from the first position data;

acquiring orientation change data indicating a change amount in an orientation of the workpiece with respect to the robot due to the change of the arrangement, based on the first position data and the second position data;

acquiring third position data of the robot when the hand-tip portion is arranged in the predetermined positional relationship with the index in a state where the hand-tip portion is arranged at a second orientation which is corrected from the first orientation by using the orientation change data;

acquiring position change data indicating a change amount in a position of the workpiece with respect to the robot due to the change of the arrangement, based on the first position data and the third position data; and controlling an operation of the robot, based on the orientation change data and the position change data.

8. A non-transitory computer-readable storage medium that stores a computer program for correcting a teaching position of a robot when an arrangement of a workpiece with respect to the robot changes, by using an index arranged at a predetermined position with respect to the workpiece, the computer program, when executed by a computer, causing the computer to execute:

acquiring first position data of the robot when a hand-tip portion of the robot is arranged in a predetermined positional relationship with the index in a state where the hand-tip portion is arranged at a first orientation, before change of the arrangement of the workpiece;

acquiring second position data of the robot when the hand-tip portion is arranged in the predetermined positional relationship with the index in the state where the hand-tip portion is arranged at the first orientation, after the change of the arrangement of the workpiece, the second position data being different from the first position data;

acquiring orientation change data indicating a change amount in an orientation of the workpiece with respect to the robot due to the change of the arrangement, based on the first position data and the second position data;

acquiring third position data of the robot when the hand-tip portion is arranged in the predetermined positional relationship with the index in a state where the hand-tip portion is arranged at a second orientation which is corrected from the first orientation by using the orientation change data;

acquiring position change data indicating a change amount in a position of the workpiece with respect to the robot due to the change of the arrangement, based on the first position data and the third position data; and controlling an operation of the robot, based on the orientation change data and the position change data.

\* \* \* \* \*